US008548419B1

(12) United States Patent
Sennett et al.

(10) Patent No.: US 8,548,419 B1
(45) Date of Patent: Oct. 1, 2013

(54) UTILIZATION OF SMS AND/OR CELLULAR BROADCAST TO RECEIVE MULTIMEDIA ALERTS

(75) Inventors: DeWayne Allan Sennett, Redmond, WA (US); Brian Kevin Daly, Seattle, WA (US)

(73) Assignee: AT&T Mobility II LLC, Atlanta, GA (US)

(*) Notice: Subject to any disclaimer, the term of this patent is extended or adjusted under 35 U.S.C. 154(b) by 1523 days.

(21) Appl. No.: 11/532,265

(22) Filed: Sep. 15, 2006

(51) Int. Cl.
H04W 4/22 (2009.01)

(52) U.S. Cl.
USPC ............... 455/404.1; 455/404.2; 455/456.1

(58) Field of Classification Search
USPC ............... 455/403, 401.1, 404.2, 412.1–2, 455/413, 414.1–2, 414.4, 466
See application file for complete search history.

(56) References Cited

U.S. PATENT DOCUMENTS

| | | | |
|---|---|---|---|
| 5,987,323 A | 11/1999 | Huotari | |
| 6,052,591 A | 4/2000 | Bhatia | |
| 6,112,075 A | 8/2000 | Weiser | |
| 6,201,856 B1 | 3/2001 | Orwick et al. | |
| 6,745,021 B1 | 6/2004 | Stevens | |
| 7,084,775 B1 | 8/2006 | Smith | |
| 7,130,610 B2 | 10/2006 | Dolezal et al. | |
| 7,233,781 B2 | 6/2007 | Hunter et al. | |
| 7,411,493 B2 | 8/2008 | Smith | |
| 7,480,501 B2 | 1/2009 | Petite | |
| 7,593,945 B2 | 9/2009 | DaCosta | |
| 7,602,277 B1 | 10/2009 | Daly et al. | |
| 7,764,946 B1 | 7/2010 | Sennett et al. | |
| 8,063,766 B2 | 11/2011 | Daly et al. | |
| 8,190,118 B2 | 5/2012 | Sennett et al. | |
| 2003/0069002 A1 | 4/2003 | Hunter et al. | |
| 2003/0143974 A1 | 7/2003 | Navarro | |
| 2003/0216133 A1 | 11/2003 | Poltorak | |
| 2004/0095954 A1* | 5/2004 | Varney et al. | 370/444 |
| 2004/0242240 A1 | 12/2004 | Lin | |
| 2004/0248546 A1 | 12/2004 | Bhaumick | |
| 2005/0037728 A1 | 2/2005 | Binzel et al. | |
| 2005/0070247 A1 | 3/2005 | Larson | |
| 2005/0086685 A1* | 4/2005 | Rahman et al. | 725/33 |
| 2005/0162267 A1 | 7/2005 | Khandelwal et al. | |
| 2005/0216464 A1 | 9/2005 | Toyama et al. | |
| 2005/0282518 A1* | 12/2005 | D'Evelyn et al. | 455/404.1 |
| 2006/0010484 A1* | 1/2006 | Fujino | 726/3 |
| 2006/0015254 A1 | 1/2006 | Smith | |

(Continued)

OTHER PUBLICATIONS

U.S. Appl. No. 13/465,449, filed May 7, 2012, Sennett et al.

(Continued)

Primary Examiner — Cong Tran
(74) Attorney, Agent, or Firm — Woodcock Washburn LLP

(57) ABSTRACT

An indication of the location of multimedia information for an emergency alert is distributed via text based protocols such as a Cell Broadcast Service (CBS) and/or a Short Message Service (SMS). Multimedia information can include maps, graphics, video clips, audio clips, still pictures, and the like. A text based alert message along with an indication of the location of the associated multimedia is distributed to users. The indication can comprise a link to a Uniform Resource Locator (URL), or the like, from which the multimedia can be retrieved. The indication can comprise a pointer to a link. For example, the alert message can comprise an address in storage of a user device, and the address can contain the link to the URL. Further, the multimedia can be retrieved automatically or manually.

14 Claims, 4 Drawing Sheets

(56) References Cited

U.S. PATENT DOCUMENTS

| | | | |
|---|---|---|---|
| 2006/0040639 A1 | 2/2006 | Karl et al. | |
| 2006/0234672 A1 | 10/2006 | Adler | |
| 2006/0293024 A1* | 12/2006 | Benco et al. | 455/404.2 |
| 2007/0032225 A1* | 2/2007 | Konicek et al. | 455/417 |
| 2007/0118608 A1* | 5/2007 | Egli | 709/217 |
| 2007/0123223 A1* | 5/2007 | Letourneau et al. | 455/414.1 |
| 2007/0204064 A1 | 8/2007 | Mail et al. | |
| 2008/0107243 A1 | 5/2008 | Terrill et al. | |
| 2008/0227430 A1* | 9/2008 | Polk | 455/404.2 |
| 2008/0268809 A1* | 10/2008 | Busin et al. | 455/404.2 |
| 2009/0199230 A1 | 8/2009 | Kumar et al. | |
| 2010/0296634 A1* | 11/2010 | Schulzrinne et al. | 379/45 |

OTHER PUBLICATIONS

U.S. Appl. No. 11/532,299, filed Sep. 15, 2006, Sennett et al.

"US unveils emergency alert system for mobile phones, computers," BREITBART, http://www.breitbart.com/article.php?id=060712191204.9i5b29n0&show_artcle=1, downloaded 2008, 1-2.

Botterell, A., "An Advanced EAS Relay Network Using the Common Alerting Protocol (CAP)," http://www.tap.qallaudet.edu/Emergency/Nov05Conference/EmergencyReports/Advanced_EAS_Concept.pdf, 2003, 1-8.

U.S. Appl. No. 11/624,503, Non-Final Rejection, dated Dec. 29, 2008, 8 pages.

U.S. Appl. No. 11/624,503, Notice of Allowance, dated Jun. 16, 2009, 6 pages.

* cited by examiner

UTILIZATION OF SMS AND/OR CELLULAR BROADCAST TO RECEIVE MULTIMEDIA ALERTS

TECHNICAL FIELD

The technical field generally relates to communications systems and more specifically relates to acquiring multimedia alerts.

BACKGROUND

Emergency alert messages can be delivered via the Short Message Service (SMS) and the Cell Broadcast Service (CBS). Currently, these technologies support only text based information.

SUMMARY

An alert, such as an alert message from the Emergency Alert System (EAS), is distributed via the Short Message Service SMS), a Cellular Broadcast Service (CBS), or a combination thereof. In an example embodiment, a text base alert message (textually formatted) is provided along with an indication of a location of multimedia associated with the alert. The indication of the location of the multimedia can comprise a link to a Uniform Resource Locator (URL), or the like, from which the multimedia can be retrieved. The indication of the location of the multimedia can comprise a pointer to a URL or the like. For example, the pointer can comprise an address in storage of a user device receiving the alerts. The multimedia can be retrieved manually (e.g., by a user) or automatically (e.g., by the user device).

BRIEF DESCRIPTION OF THE DRAWINGS

The foregoing summary, as well as the following detailed description, is better understood when read in conjunction with the appended drawings.

DETAILED DESCRIPTION OF ILLUSTRATIVE EMBODIMENTS

Alerts formatted as multimedia, such as text, a picture, video, and/or audio, can be advantageous in various situations. For example, a first responder or an emergency manager at a disaster site or emergency situation could benefit from receiving multimedia information associated with a alert pertaining to the disaster/emergency. Multimedia such as maps, graphics, video clips, audio clips, and still pictures can aid the first responder/manager in better assessing the situation and directing others.

Various embodiments for utilization of SMS and cellular broadcast to receive multimedia alerts are described herein. In the various embodiments, an alert message can comprise a link to a Uniform Resource Locator (URL), or the like, from which the multimedia can be retrieved. The alert message can comprise a pointer to a link. For example, the alert message can comprise an address in storage of a user device, and the address contains the link to the URL. Further, the multimedia can be retrieved automatically or manually. The various embodiments are described with reference to FIG. 1, which is a flow diagram of an example process and system for utilizing SMS and/or cellular broadcast to receive multimedia alerts.

Figure 1:
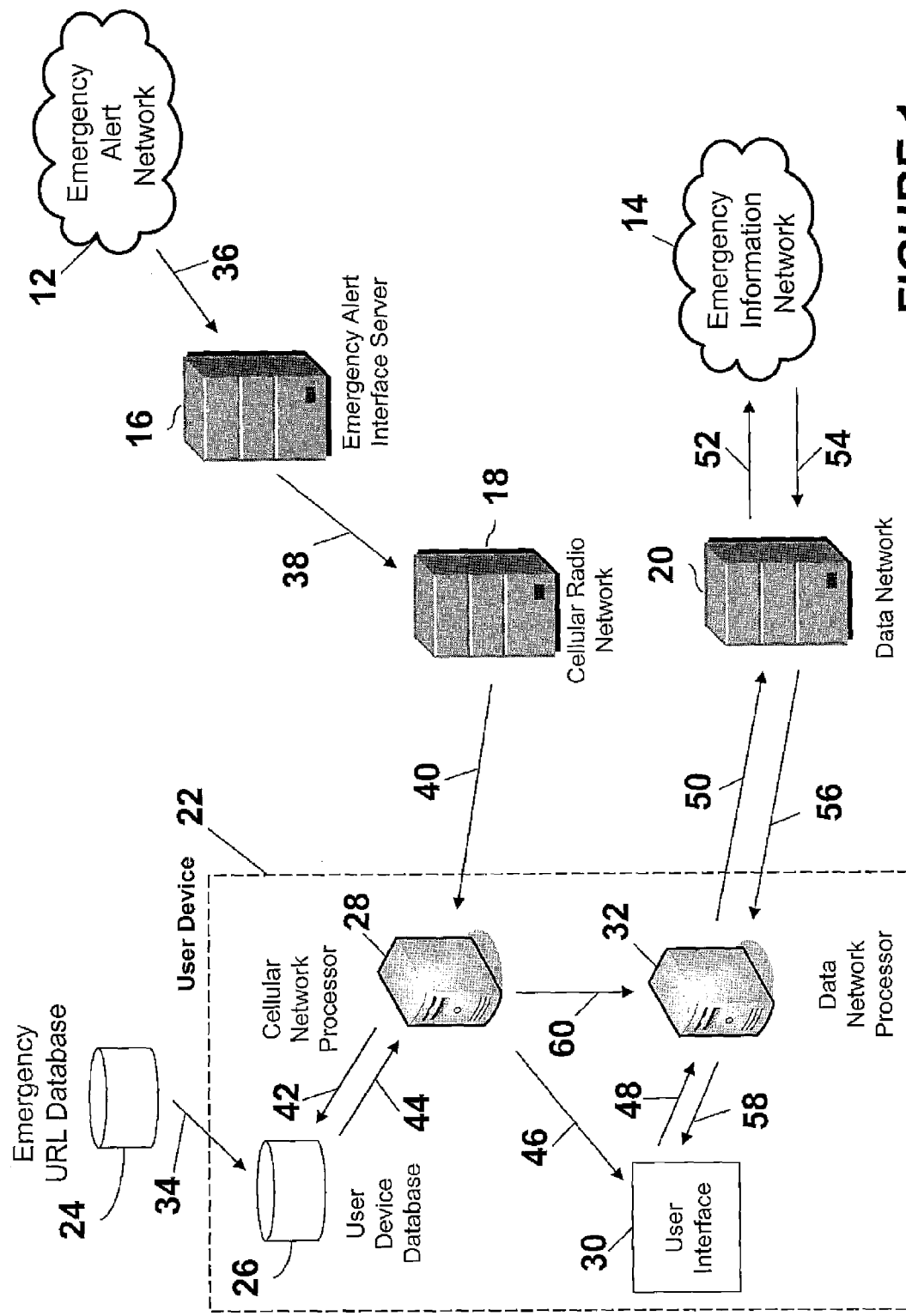
FIG. 1 flow diagram of an example process and system for utilization of SMS and/or cellular broadcast to receive multimedia alerts.

In an example embodiment, an alert message is delivered to a user device along with a list of associated URL addresses for an related multimedia information. The user selects multimedia information from a list. Referring to FIG. 1, the emergency alert network 12 provides, at step 36, an indication of an emergency. The emergency alert network 12 provides (at step 36) the indication of the alert to an emergency alert interface server 16. In an example embodiment, the indication of the alert (provided at step 36) comprises an alert message and an indication of a location of multimedia associated with the alert. In an example embodiment, the alert message is a textual message. That is, the alert message if formatted such that it is renderable as text. At step 38, the emergency alert interface server 16 provides, to a cellular radio network 18, the combination of the alert message information and the multimedia related information. In an example embodiment, the combination is provided via a cellular text based delivery protocol such as the Short Message Service (SMS) and/or a Cellular Broadcast Service (CBS). Thus, at step 38, the indication of the alert along with the indication of the location of multimedia associated with the alert is provided, via a cellular text based deliver protocol, to the cellular radio network 18.

At step 40, the cellular radio network 18, provides to a cellular network processor 28 of a user device 22, the indication of the alert along with the indication of the location of multimedia associated with the alert. In an example embodiment, the user decides whether to retrieve the multimedia and selects which URL from which to retrieve the multimedia. In accordance with this embodiment, at step 46, the indication of the alert along with the indication of the location of multimedia associated with the alert are provided to the user interface 30. The user interface 30 comprises a display, for example, for rendering the alert message in textual format. The user interface 30 also renders the locations of the multimedia. In an example embodiment, the user interface 30 renders a link, or links, to a URL, or URLs, from which multimedia can be retrieved. If the user decides to retrieve the multimedia, the user selects the link, or links, from which to retrieve the multimedia.

At step 48, an indication of the user's selection is provided to the data network processor 32. The data network processor 32 establishes a connection with the data network 20, if a connection is not currently established. At step 50, the data network processor 32 provides to the data network 20, the URL address(es) selected by the user. The data network 20, at step 52, using the selected URL address, establishes a connection with an emergency information network 14. The emergency information network 14 can comprise any appropriate network, processor, storage means, or the like, capable of storing and retrieving multimedia information associated with an alert. The data network 20 establishes the connection with the location in the emergency information network 14 indicated by the selected URL(s). The data network 20, also at step 52, requests retrieval of the multimedia located at the selected URL(s) in the emergency information network 14. The emergency information network 14, at step 54, provides the requested multimedia information to the data network 20. The data network 20 provides the requested multimedia information to the data network processor 32, at step 56. The data network processor 32 provides the requested multimedia information to the user interface 30 for rendering. In various embodiments, multimedia information associated with each selected URL can be retrieved individually, multimedia information associated with a subset of the selected URLs can be retrieved, or multimedia information associated with all the selected URLs can be retrieved.

In another example embodiment, the alert message is delivered to the user device 22 along with a list of associated URL addresses for any related multimedia information. The user device 12 automatically retrieves the multimedia information using the list of URL addresses provided. In this embodiment, steps 36, 38 and 40 occur as described above. At step 46, however, the indication of the alert, without the indication of the location of multimedia associated with the alert, is provided to the user interface 30. The cellular network processor 28 extracts the list of URL addresses from the emergency alert message and, at step 60, requests the data network processor 32 to retrieve the associated multimedia information. At step 50, the data network processor 32 provides to the data network 20, the URL address(es) extracted by the cellular network processor 28.

The data network 20, at step 52, using the extracted URL address, establishes a connection with an emergency information network 14. The data network 20 establishes the connection with the location in the emergency information network 14 indicated by the selected URL(s). The data network 20, also at step 52, requests retrieval of the multimedia located at the extracted URL(s) in the emergency information network. 14. The emergency information network 14, at step 54, provides the requested multimedia information to the data network 20. The data network 20 provides the requested multimedia information to the data network processor 32, at step 56. The data network processor 32 provides the requested multimedia information to the user interface 30 for rendering. In various embodiments, multimedia information associated with each selected URL can be retrieved individually, multimedia information associated with a subset of the selected URLs can be retrieved, or multimedia information associated with all the selected URLs can be retrieved.

In another example embodiment, the alert message is delivered to the user device 22 without the list of associated URL addresses for any related multimedia information. The user device 22 comprises a preprovisioned database 26, or appropriate storage means, having stored therein associated addresses of multimedia information based upon the received alert message. A list of associated URL addresses for related multimedia information is generated from the preprovisioned database 26. The user selects links to multimedia from the generated list.

At step 34, prior to the occurrence of an event resulting in an alert, the locations, e.g., URL addresses, for multimedia emergency alert information are downloaded to the user device database 26 from an emergency URL database 24. The emergency URL database 24 can comprise any appropriate network, processor, storage means, or the like, capable of storing and providing URL addresses associated with multimedia information pertaining to an alert. Upon the occurrence of an event, such as an emergency or the like, the emergency alert network 12 provides, at step 36, an indication of the emergency. The emergency alert network 12 provides (at step 36) the indication of the alert to an emergency alert interface server 16 without an indication of a location of multimedia associated with the alert. At step 40, the emergency alert interface server 16 provides, to a cellular radio network 18, the alert message information. In an example embodiment, the alert message is provided, as described above, via a text based delivery protocol such as the SMS and/or a CBS. Thus, in accordance with this example embodiment, at step 38, the indication of the alert without the indication of the location of multimedia associated with the alert is provided, via a text based deliver protocol, to the cellular radio network 18.

At step 40, the cellular radio network 18, provides to the cellular network processor 28 of a user device 22, the indication of the alert without the indication of the location of multimedia associated with the alert. The cellular network processor 28 determines the type of emergency, or the like, based upon the received emergency alert message. The cellular network processor 28 requests, at step 42, the list of associated URL addresses from the user device database 26. The user device database 26 retrieves the list of URL addresses associated with the indicated type of emergency, or the like, and returns, at step 44, the list of URL addresses to the cellular network processor 28.

In an example embodiment, the user decides whether to retrieve the multimedia and selects which URL from which to retrieve the multimedia. In accordance with this embodiment, at step 46, the indication of the alert along with the indication of the location of multimedia associated with the alert are provided to the user interface 30. The user interface 30 renders the alert message in textual format. The user interface 30 also renders the locations of the multimedia. In an example embodiment, the user interface 30 renders a link, or links, to a URL, or URLs, from which multimedia can be retrieved. If the user decides to retrieve the multimedia, the use selects the link, or links, from which to retrieve the multimedia.

At step 48, an indication of the user's selection is provided to the data network processor 32. The data network processor 32 establishes a connection with the data network 20, if a connection is not currently established. At step 50, the data network processor 32 provides to the data network 20, the URL address(es) selected by the user. The data network 20, at step 52, using the selected URL address, establishes a connection with an emergency information network 14. The data network 20 establishes the connection with the location in the emergency information network 14 indicated by the selected URL(s). The data network 20, also at step 52, requests retrieval of the multimedia located at the selected URL(s) in the emergency information network 14. The emergency information network 14, at step 54, provides the requested multimedia information to the data network 20. The data network 20 provides the requested multimedia information to the data network processor 32, at step 56. The data network processor 32 provides the requested multimedia information to the user interface 30 for rendering. In various embodiments, multimedia information associated with each selected URL can be retrieved individually, multimedia information associated with a subset of the selected URLs can be retrieved, or multimedia information associated with all the selected URLs can be retrieved.

In another example embodiment, the alert message is delivered to the user device 22 without the list of associated URL addresses for any related multimedia information. The user device 22 comprises a preprovisioned database 26, or appropriate storage means, having stored therein associated addresses of multimedia information based upon the received alert message. A list of associated URL addresses for related multimedia information is generated from the preprovisioned database 26. The user device 12 automatically retrieves the multimedia information using the generated list of URL addresses.

In this embodiment, at step 34, prior to the occurrence of an event resulting in an alert, the URL addresses for multimedia emergency alert information is downloaded to he user device database 26 from an emergency URL database 24. Upon the occurrence of an event, such as an emergency or the like, the emergency alert network 12 provides, at step 36, an indication of the emergency. The emergency alert network 12 provides (at step 36) the indication of the alert to an emergency alert interface server 16 without an indication of a location of multimedia associated with the alert. At step 40, the emergency alert interface server 16 provides, to a cellular radio network 18, the alert message information. In an example embodiment, the alert message is provided, as described above, via a text based delivery protocol such as the SMS and/or a CBS. Thus, in accordance with this example embodiment, at step 38, the indication of the alert without the indication of the location of multimedia associated with the alert is provided, via a text based deliver protocol, to the cellular radio network 18.

At step 40, the cellular radio network 18, provides to the cellular network processor 28 of a user device 22, the indication of the alert without the indication of the location of multimedia associated with the alert. The cellular network processor 28 determines the type of emergency, or the like, based upon the received emergency alert message. The cellular network processor 28 requests, at step 42, the list of associated URL addresses from the user device database 26. The user device database 26 retrieves the list of URL addresses associated with the indicated type of emergency, or the like, and returns, at step 44, the list of URL addresses to the cellular network processor 28. At step 46, the indication of the alert (e.g., the alert message), without the indication of the location of multimedia associated with the alert, is provided to the user interface 30 for rendering.

The cellular network processor 28, using the generated list of URL addresses, requests, at step 60, the data network processor 32 to retrieve the multimedia information associated with the generated list of URLs. At step 50, the data network processor 32 provides to the data network 20, the generated list URL addresses. The data network 20, at step 52, using the generated URL address, establishes a connection with an emergency information network 14. The data network 20 establishes the connection with the location in the emergency information network 14 indicated by the generated URL addresses. The data network 20, also at step 52, requests retrieval of the multimedia located at the extracted URL addresses in the emergency information network 14. The emergency information network 14, at step 54, provides the requested multimedia information to the data network 20. The data network 20 provides the requested multimedia information to the data network processor 32, at step 56. The data network processor 32 provides the requested multimedia information to the user interface 30 for rendering. In various embodiments, multimedia information associated with each selected URL can be retrieved individually, multimedia information associated with a subset of the selected URLs can be retrieved, or multimedia information associated with all the selected URLs can be retrieved.

The user device 22 can comprise any appropriate user device. For example, the user device 22 comprise a mobile device, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The user device 22 can comprise a system comprising an input/output portion, a processing portion, and a memory portion. In an example embodiment the memory portion comprises the user device database 26 and/or any memory associated with the cellular network processor 28, the data network processor 32, the user interface 30, or a combination thereof, for example. The processing portion can comprise the cellular network processor 28, the data network processor 32, or any appropriate portions thereof, for example. The input/output portion can comprise any appropriate portions of the user device database 26, the cellular network processor 28, and the data network processor 32, that interface with the emergency URL database 24, the cellular radio network 18, and the data network 20.

It is emphasized that the diagram depicted in FIG. 1 of the user device is exemplary and not intended to imply a specific implementation. Thus, the user device 22 can be implemented in a single processor or multiple processors. Multiple processors can be distributed or centrally located. Multiple processors can communicate wirelessly, via hard wire, or a combination thereof.

The cellular radio network 18 can comprise any appropriate telephony radio network. The following description sets forth some exemplary telephony radio networks, such as the global system for mobile communications (GSM), and non-limiting operating environments. The below-described operating environments should be considered non-exhaustive, however, and thus the below-described network architectures merely show how utilization of SMS and/or cellular broadcast to receive multimedia alerts can be incorporated with existing network structures and architectures. It can be appreciated, however, that utilization of SMS and/or cellular broadcast to receive multimedia alerts can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of the utilization of SMS and/or cellular broadcast to receive multimedia alerts can be applied independently of the method of data transport, and do not depend on any particular network architecture, or underlying protocols.

Figure 2:
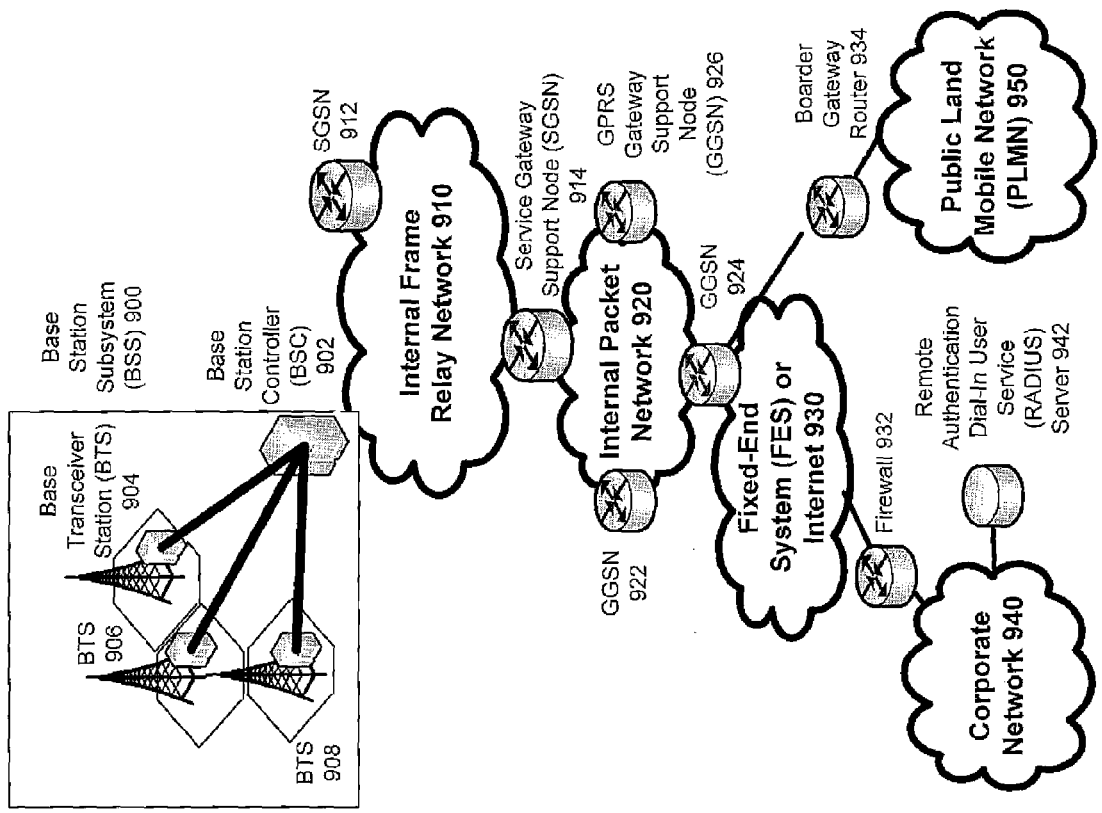
FIG. 2 depicts an overall block diagram of an exemplary packet-based mobile cellular network environment.

FIG. 2 depicts an overall block diagram of an exemplary packet-based mobile cellular network environment, such as a GPRS network, in which utilization of SMS and/or cellular broadcast to receive multimedia alerts can be practiced. In an example configuration, the Cellular radio network 18 is encompassed by the network environment depicted in FIG. 2. In such an environment, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices (e.g., user device 22) become connected to the wireless network. In exemplary fashion, the packet traffic originating from user devices (e.g., user device 20) is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 3:
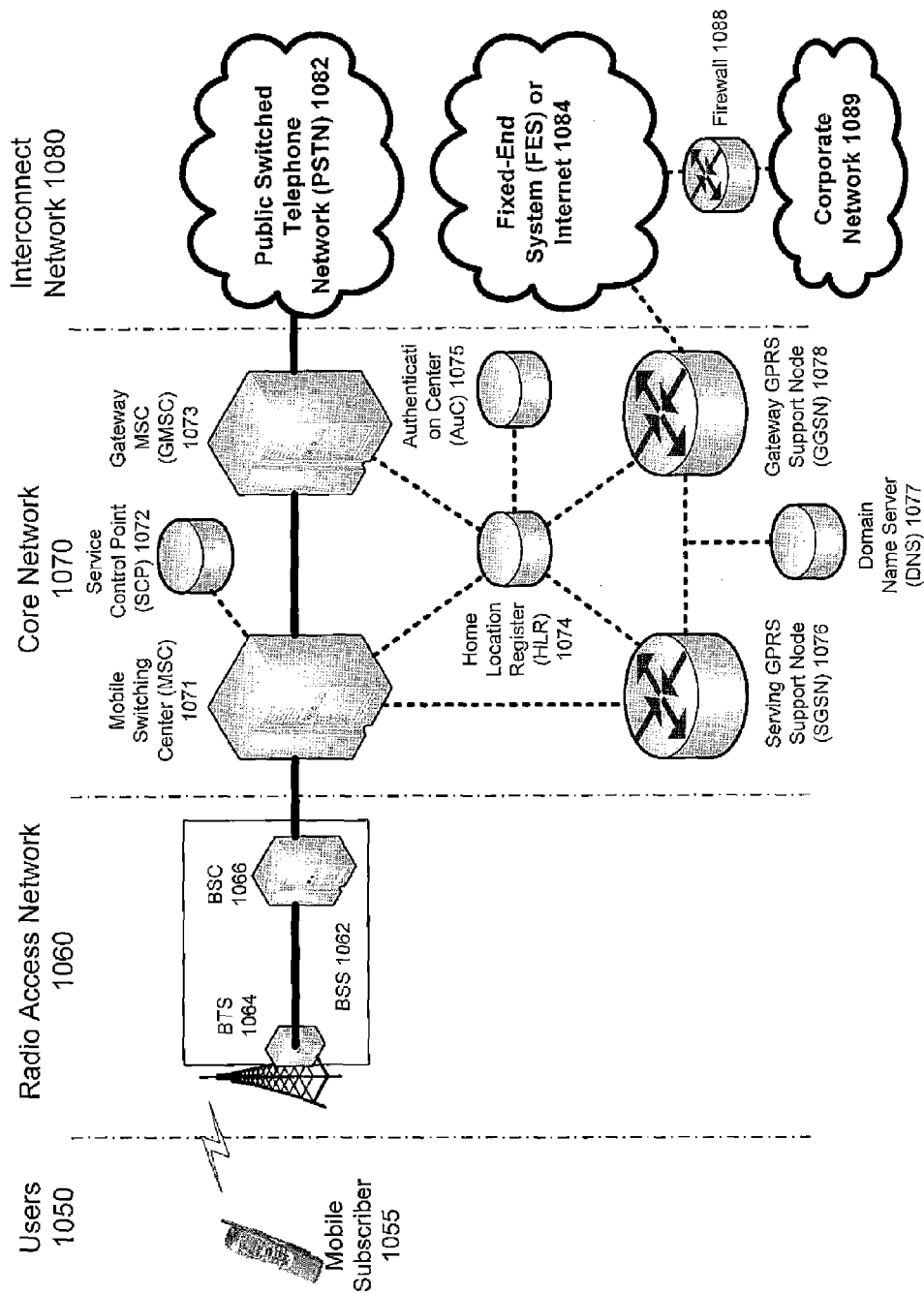
FIG. 3 illustrates an architecture of a typical GPRS network.

FIG. 3 illustrates an architecture of a typical GPRS network segmented into four groups: users 1050, radio access network 1060, core network 1070, and interconnect network 1080. Users 1050 comprise a plurality of end users (though only mobile subscriber 1055 is shown in FIG. 3). In an example embodiment, the device depicted as mobile subscriber 1055 comprises user device 22. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 3, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the user device 22, used by an end user of the mobile cellular service. When a mobile subscriber turns on his or her mobile device, the mobile device goes through an attach process by which the mobile device attaches to an SGSN of the GPRS network. In FIG. 3, when mobile subscriber 1055 initiates the attach process by turning on the network capabilities of the mobile device, an attach request is sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 requests more information from mobile subscriber 1055. This information is used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1055 was attached before, to cancel the location process for mobile subscriber 1055. HLR 1074 then notifies SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1055. The mobile subscriber 1055 uses an algorithm to send the user identification (ID) and password to SGSN 1076. The SGSN 1076 uses the same algorithm and compares the result. If a match occurs, SGSN 1076 authenticates mobile subscriber 1055.

Next, the mobile subscriber 1055 establishes a user session with the destination network, corporate network 1089, by going through a Packet Data Protocol ("PDP") activation process. Briefly, in the process, mobile subscriber 1055 requests access to the Access Point Name ("APN"), for example, UPS.com, and SGSN 1076 receives the activation request from mobile subscriber 1055. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1055.

Once activated, data packets of the call made by mobile subscriber 1055 can then go through radio access network 1060, core network 1070, and interconnect network 1080, in a particular fixed-end system or Internet 1084 and firewall 1088, to reach corporate network 1089.

Thus, network elements that can invoke the functionality of utilization of SMS and/or cellular broadcast to receive multimedia alerts can include but are not limited to Gateway GPRS Support Node tables, Fixed End System router tables, firewall systems, VPN tunnels, and any number of other network elements as required by the particular digital network.

Figure 4:
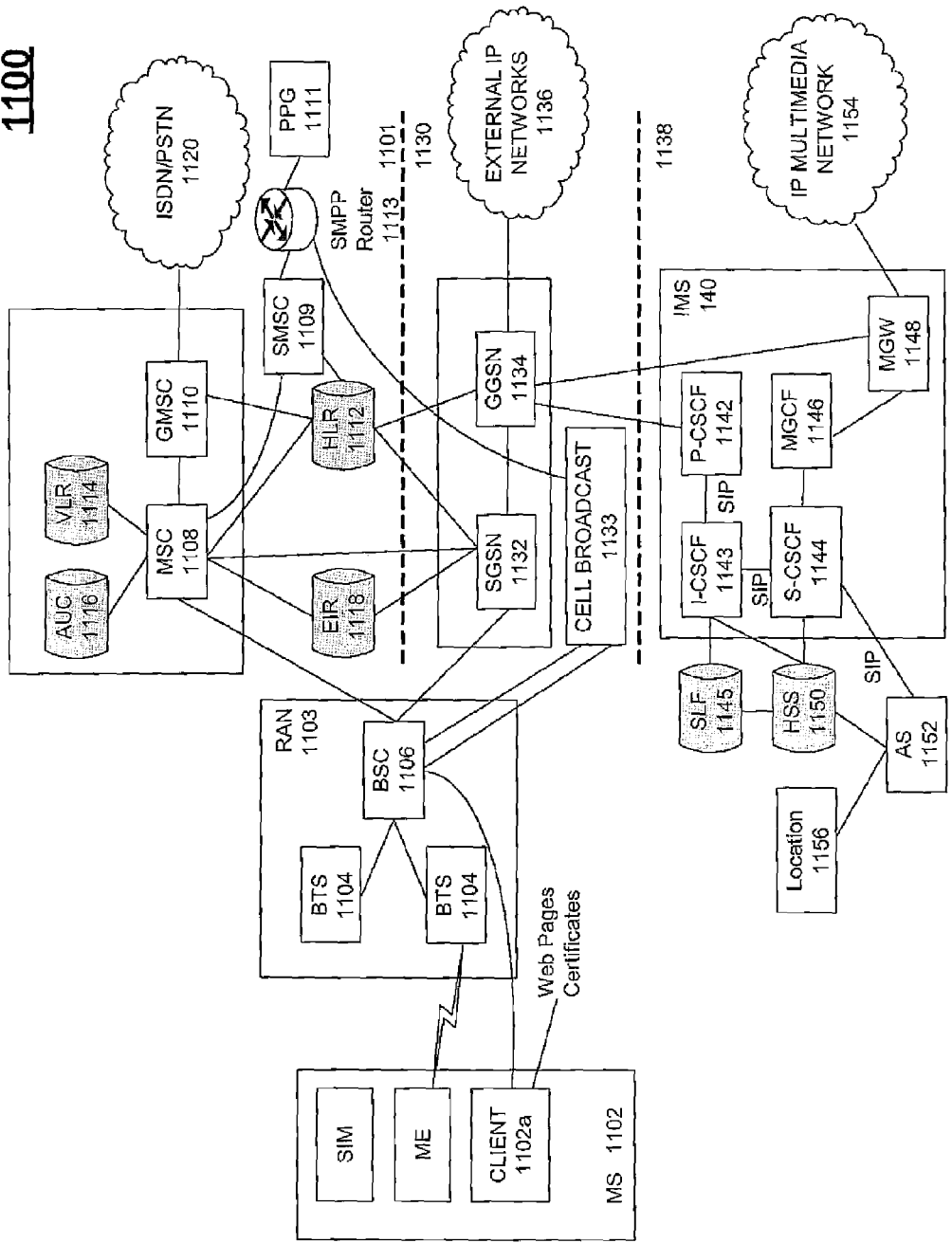
FIG. 4 illustrates another exemplary block diagram view of a GSM/GPRS/IP multimedia network architecture.

FIG. 4 illustrates another exemplary block diagram view of a GSM/GPRS/IP multimedia network architecture 1100 with which the utilization of SMS and/or cellular broadcast to receive multimedia alerts can be incorporated. As illustrated, architecture 1100 of FIG. 4 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer (e.g., user device 22) that is used by mobile subscribers, with a Subscriber identity Module (SIM). The SIM includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1138 was introduced with 3GPP Release 5, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143, forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of the utilization of SMS and/or cellular broadcast to receive multimedia alerts have been described in connection with various computing devices/processor, the underlying concepts can be applied to any computing device, processor, or system capable of utilizing of SMS and/or cellular broadcast to receive multimedia alerts. The various techniques described herein can be implemented in connection with hardware or software or, where appropriate, with a combination of both. Thus, the methods and apparatuses for the utilization of SMS and/or cellular broadcast to receive multimedia alerts, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for the utilization of SMS and/or cellular broadcast to receive multimedia alerts. In the case of program code execution on programmable computers, the computing device will generally include a processor, a storage medium readable by the processor (including volatile and non-volatile memory and/or storage elements), at least one input device, and at least one output device. The program (s) can be implemented in assembly or machine language, if desired. The language can be a compiled or interpreted language, and combined with hardware implementations.

The methods and apparatuses for the utilization of SMS and/or cellular broadcast to receive multimedia alerts also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of SMS and/or cellular broadcast to receive multimedia alerts. When implemented on a general-purpose processor, the program code combines with the processor to provide a unique apparatus that operates to invoke the functionality of the utilization of SMS and/or cellular broadcast to receive multimedia alerts. Additionally, any storage techniques used in connection with the utilization of SMS and/or cellular broadcast to receive multimedia alerts can invariably be a combination of hardware and software.

While the utilization of SMS and/or cellular broadcast to receive multimedia alerts has been described in connection with the various embodiments of the various figures, it is to be understood that other similar embodiments can be used or modifications and additions can be made to the described embodiment for performing the same function of utilizing SMS and/or cellular broadcast to receive multimedia alerts without deviating therefrom. For example, one skilled in the art will recognize that the utilization of SMS and/or cellular broadcast to receive multimedia alerts a as described in the present application may apply to any environment, whether wired or wireless, and may be applied to any number of such devices connected via a communications network and interacting across the network. Therefore, the utilization of SMS and/or cellular broadcast to receive multimedia alerts should not be limited to any single embodiment, but rather should be construed in breadth and scope in accordance with the appended claims.

What is claimed:

1. A method comprising:
    receiving, via a cellular text based delivery protocol, an indication of an emergency;
    determining a type of the emergency alert;
    determining, based on the type of the emergency alert, an indication of a location of multimedia associated with the emergency, the indication comprising a plurality of links to respective uniform resource locators, wherein the multimedia comprises at least one of a map, a graphic, a video clip, an audio clip, or a still picture, pertaining to the emergency;
    receiving an indication of a selected link from the plurality of links; and
    retrieving multimedia via the selected link.

2. The method in accordance with claim 1, wherein the cellular text based delivery protocol comprises at least one of a short message service (SMS) or a cellular broadcast service (CBS).

3. The method in accordance with claim 1, wherein:
    the indication of the location of the multimedia further comprises a pointer to a link to at least one uniform resource locator (URL); and
    the multimedia is retrievable via the at least one URL.

4. The method in accordance with claim 1, further comprising automatically retrieving the multimedia via a link of the plurality of links.

5. The method in accordance with claim 1, further comprising rendering at least one of:
    an alert message associated with the alert in a textual format; and
    retrieved multimedia.

6. The method in accordance with claim 1, wherein:
    the indication of the alert and the indication of a location of multimedia associated with the alert are received by a device; and
    the device comprises at least one of a mobile device, a portable device, a portable media player, a portable music player, an MP3 player, a portable computing device, a laptop, a personal digital assistant (PDA), a portable phone, a cellular phone, a smart phone, a Session Initiation Protocol (SIP) phone, a video phone, a portable email device, a thin client, a portable gaming device, a television, a DVD player, a set top box, a kiosk, an in-store music sampling device, an automated teller machine (ATM), a navigation device, a kitchen appliance, and a motor vehicle.

7. The method in accordance with claim 1, wherein:
    the alert is renderable in a textual format; and
    the multimedia comprises a combination of at least two of graphic content, video content, and audio content.

8. A multimedia alert system comprising:
    a processor; and
    memory coupled to the processor, the memory having stored thereon executable instructions that when executed by the processor cause the processor to effectuate operations comprising:
        receiving, via a cellular text based delivery protocol, an indication of an emergency;
        determining, based on the type of the emergency alert, an indication of a location of multimedia associated with the emergency, the indication comprising a plurality of links to respective uniform resource locators, wherein the multimedia comprises at least one of a map, a graphic, a video clip, an audio clip, or a still picture, pertaining to the alert;
        receiving an indication of a selected link from the plurality of links; and
        receiving multimedia via the selected link.

9. The system in accordance with claim 8, wherein the cellular text based delivery protocol comprises at least one of a short message service (SMS) or a cellular broadcast service (CBS).

10. The system in accordance with claim 8, wherein:
    the indication of the location of the multimedia further comprises a pointer to a link to at least one uniform resource locator (URL); and
    the multimedia is retrievable via the at least one URL.

11. The system in accordance with claim 8, the operations further comprising automatically retrieving the multimedia via a link of the plurality of links.

12. The system in accordance with claim 8, the operations further comprising rendering, on a display of the system, retrieved multimedia.

13. The system in accordance with claim 8, wherein:
    the system comprises a device for receiving the alert and the indication of a location of multimedia associated with the alert; and
    the device comprises at least one of a mobile device, a portable device, a portable media player, a portable music player, an MP3 player, a portable computing device, a laptop, a personal digital assistant (PDA), a portable phone, a cellular phone, a smart phone, a Session Initiation Protocol (SIP) phone, a video phone, a portable email device, a thin client, a portable gaming device, a television, a DVD player, a set top box, a kiosk, an in-store music sampling device, an automated teller machine (ATM), a navigation device, a kitchen appliance, and a motor vehicle.

14. The system in accordance with claim 8, wherein:
    the alert is renderable in a textual format; and
    the multimedia comprises a combination of at least two of graphic content, video content, and audio content.

* * * * *